(12) United States Patent
Schinner

(10) Patent No.: US 6,989,861 B2
(45) Date of Patent: Jan. 24, 2006

(54) USER SELECTION OF POWER-ON CONFIGURATION

(75) Inventor: Charles E. Schinner, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 09/952,108

(22) Filed: Sep. 14, 2001

(65) Prior Publication Data

US 2003/0052984 A1    Mar. 20, 2003

(51) Int. Cl.
*H04N 5/76* (2006.01)

(52) U.S. Cl. .............................. 348/231.6; 348/211.6; 348/231.2; 348/231.3; 348/231.5; 348/231.6; 348/231.9; 348/231.99

(58) Field of Classification Search ............ 348/231.2, 348/231.3, 231.5, 231.6, 231.9, 231.99, 333.02, 348/211.6
See application file for complete search history.

(56) References Cited

U.S. PATENT DOCUMENTS

| | | | |
|---|---|---|---|
| 6,134,606 A * | 10/2000 | Anderson et al. | 710/14 |
| 6,487,127 B2 * | 11/2002 | Johnson et al. | 365/189.05 |
| 6,493,028 B1 * | 12/2002 | Anderson et al. | 348/222.1 |
| 2003/0095193 A1 * | 5/2003 | May et al. | 348/231.3 |

\* cited by examiner

*Primary Examiner*—Thai Tran
*Assistant Examiner*—Chriss Yoder

(57) ABSTRACT

An image capturing device includes a user interface, a processor, and a memory. The memory includes a user-programmable non-volatile memory section that stores one or more non-volatile mode variables. The user interface is capable of receiving a mode input from a user and the processor is capable of overwriting a non-volatile mode variable value in the user-programmable non-volatile memory section in response to the mode input.

19 Claims, 3 Drawing Sheets

USER SELECTION OF POWER-ON CONFIGURATION

FIELD OF THE INVENTION

The present invention relates generally to an image capturing device, and more particularly to mode variables of an image capturing device.

BACKGROUND OF THE INVENTION

Image capturing devices are used to visually memorialize persons, scenes, events, or items. Image capturing devices, such as cameras, include a lens, a shutter, and an image sensor. In addition, most modern cameras include a processor and a memory that function to control shutter speed, aperture, flash, focus, etc. The processor may be used to operate the image capturing device by accepting user inputs and controlling the image capture process in accordance with preset parameters. As a consequence, during the operation of the image capturing device the processor accesses variables stored in the memory.

The memory may include both volatile and non-volatile memory. Volatile memory refers to memory that does not retain stored information when power is removed, such as static and dynamic random access memory (RAM). The volatile memory is commonly used for temporary values and non-permanent data.

In contrast, non-volatile memory retains stored information even when electrical power is removed, and it may be retrieved when electrical power is restored to the memory. Non-volatile memory includes types of read-only memory (ROM), for example.

One of the common uses of a non-volatile memory is storing power-on initialization variables that are used to set operational parameters of the image capturing device when power to the device is first turned on. The power-on variables may include, for example, strobe (i.e., flash operation), auto focus, and image resolution variable values, among others. The power-on variables are typically programmed into a non-volatile memory section and may be copied into volatile memory during initialization of the device at power-up. This may be done in order to speed read times of mode variables. Even though the mode variables could be read out of the non-volatile memory section, read times for a volatile memory are typically faster. The user may be able to modify the volatile memory variables, but not the original non-volatile memory variables.

Use of a non-volatile memory is advantageous in that it can retain desired information in a permanent manner. However, it has disadvantages. The non-volatile memory generally has longer access (read) times than volatile memory types and is generally more expensive. Therefore, in electronic appliances, manufacturers and designers typically use user-programmable non-volatile memory only for essential variables.

However, there are drawbacks in the prior art memory usage approach. According to the prior art, the variables stored in user-programmable non-volatile memory are typically values created by a design team and therefore are not changeable by the user. In the prior art, cameras have employed programmable non-volatile memory (i.e., PROM), but have not employed erasable, programmable non-volatile memory (i.e., EPROM or flash memory) for storing power-on variables that are user-changeable. In the prior art, the power-on variables are typically programmed at the factory into PROM memory. Therefore, the power-on variables of a prior art camera cannot be permanently changed by the user.

User changes in the user memory section are lost when the image capturing device is powered off or when the battery is changed. In a strobe mode, for example, the user may have to configure the mode to a desired setting each time the camera is powered up. Therefore, if the factory programming is set so that the strobe is set to an auto mode, the user will have to configure the mode to a strobe-off mode each time the camera is powered-on. If the user prefers that the strobe is always off, a frequent resetting is required. This is quite annoying for the user. As a result, control is in the hands of the designer and the user cannot configure the camera to remember his or her personal preferences.

Therefore, there remains a need in the art for improvements in image capturing devices.

SUMMARY OF THE INVENTION

An image capturing device comprises a user interface, a processor, and a memory. The memory includes a user-programmable non-volatile memory section that stores one or more non-volatile mode variables. The user interface is capable of receiving a mode input from a user and the processor is capable of overwriting a nonvolatile mode variable value in the user-programmable non-volatile memory section in response to the mode input.

DETAILED DESCRIPTION

Figure 1:
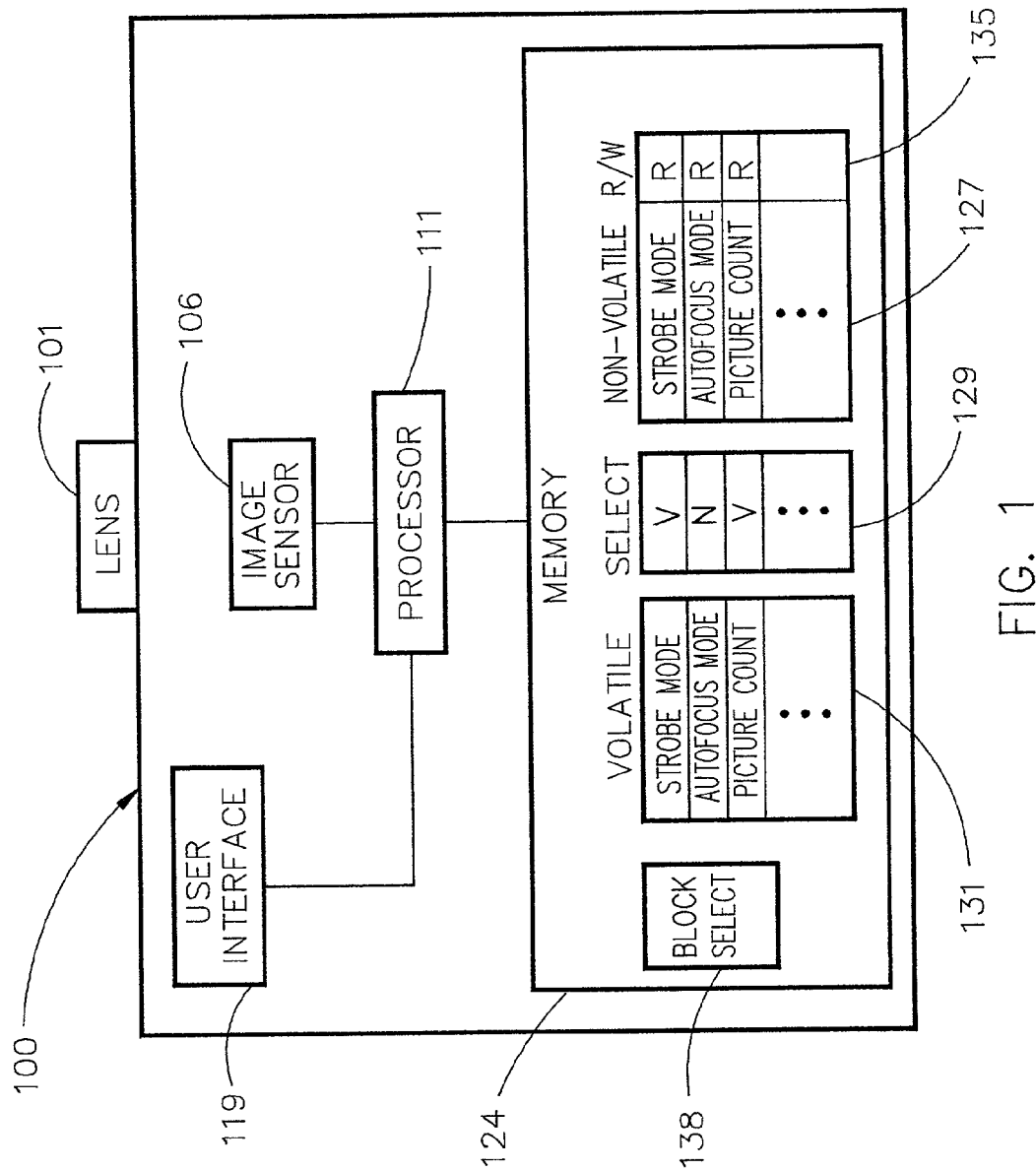
FIG. 1 is a block diagram of an image capturing device according to one embodiment of the invention.

FIG. 1 is a block diagram of an image capturing device 100 according to one embodiment of the invention. The image capturing device 100 may include a lens apparatus 101, an image sensor 106, a processor 111, a user interface 119, and a memory 124.

The image sensor 106 may be a conventional film or an electronic image sensor, such as a CCD array or CMOS array, for example.

The processor 111 may be any type of general purpose or specialized processor, such as a digital signal processor (DSP), and may control the overall operation of the image capturing device 100. In addition, the processor 111 controls the exposure of the image sensor 106 during an image capture. If the image capturing device 100 is a digital still camera, the processor may additionally control the storage of digital images, such as storing them into the memory 124. Furthermore, the processor 111 receives user inputs through the user interface 119 and performs functions specified by the user inputs.

The user interface 119 may be employed by a user to select modes and change mode settings. A change to a mode setting may change an underlying mode variable. The user interface 119 includes an input capability and may combine input and output capabilities. The user interface 119 may include any type or combination of buttons, switches, etc., and may include one or more displays. A display may provide mode variables in some form of display arrangement, such as a menu, for example. For example, the user interface 119 may include an LCD screen (not shown) on the back of the image capturing device 100 and one or more accompanying input buttons (or other input devices). The user interface 119 may display a volatile or non-volatile status of one or more mode variables.

The memory 124 may be any type of memory, including all types of random access memory (RAM), read-only memory (ROM), flash memory, magnetic storage media, such as magnetic disk, tape, etc., or optical or bubble memory. In addition, the memory 124 may comprise multiple types, as is common for embedded microprocessors. The memory 124 may include, among other things, a user-programmable non-volatile memory section 127, a select memory section 129, a volatile memory section 131, and optionally one or more block select variables 138. In addition, the memory 124 may store a software program to be executed by the processor 111.

The volatile (VOL) memory section 131 and the non-volatile (NON-VOL) memory section 127 may store, among other things, power-on initialization variables. These power-on initialization variables may include, for example, picture quality, instant review, on/off sound, LCD contrast/brightness, video format, language setting, strobe, auto focus, picture count, picture mode, auto white balance, auto exposure compensation, image resolution, etc.

The user-programmable non-volatile memory section 127 advantageously retains stored variables over power cycles (or other loss of power). However, unlike the prior art, the user may program values into the user-programmable non-volatile memory section 127. Therefore, the user-programmable non-volatile memory section 127 may be any type of erasable, programmable read-only memory (EPROM), such as CMOS RAM (complementary metal oxide semiconductor random access memory), EEPROM (electrically erasable programmable read-only memory), UVPROM (ultraviolet erasable programmable read-only memory), etc. The user-programmable non-volatile memory section 127 may further include read/write (R/W) cells 135 that control write operations to corresponding user-programmable non-volatile memory cells.

The volatile memory section 131 may include copies of power-on variables from the user-programmable non-volatile memory section 127. The copies may be read into the volatile memory section 131 at every power-on. This may be done in order to speed read times of mode variables, even though the mode variables could be read out of the user-programmable non-volatile memory section 127. Any user changes to power-on variables in the volatile memory section 131 do not survive over a power cycle.

The select memory section 129, according to the invention, allows a user to choose between a user-programmable non-volatile memory value and a volatile memory value. Therefore, by configuring the select memory section 129, the user can choose between what is termed a sticky or a non-sticky mode, i.e., the user can choose whether a particular mode variable is retained or lost over a power cycle. The selection may be indicated by a flag or other variable (shown as a V for volatile and a N for non-volatile). In the examples shown, the strobe mode has been selected to employ a volatile value. The select memory section 129 may be used by the processor 111 to display a volatile or non-volatile status for one or more mode variables.

In use, a user may designate whether a particular mode variable is sticky (non-volatile) or non-sticky (volatile) by changing the particular cell in the select memory section 129. The user may therefore determine which mode variables retain a factory setting and which mode variables may be permanently customized by the user. The user may therefore change a mode variable only once, or only when he or she desires.

The one or more block select variables 138 may designate a block of mode variables that are to be set in unison. Therefore, all mode variables designated in a block select variable 138 are set to volatile or non-volatile. This may be desirable for certain mode variables, such as for display mode variables, for example.

In addition, according to the invention, the user-programmable non-volatile memory section 127 may be changeable by the user. Therefore, the user-programmable non-volatile memory section 127 may include the read/write cells 135. The read/write cells 135 correspond to the user-programmable non-volatile memory cells of the user-programmable non-volatile memory section 127. A read/write cell therefore controls a write state of a corresponding non-volatile mode variable. The read/write cells 135 are normally in a read (R) state, but may be temporarily set to a write (W) state in order to allow a change to a corresponding user-programmable nonvolatile memory cell. The read/write cells 135 may be changed, and allow the user to change a value in the user-programmable non-volatile memory section 127.

In an alternative embodiment, the memory 124 may include only the user-programmable non-volatile memory section 127 and the corresponding read/write cells 135. In this embodiment, the read/write cells 135 are made available to the user. Therefore, the image capturing device 100 may allow some or all mode variables to be user-settable, or may present to the user the capability to modify a block of mode variables in the user-programmable non-volatile memory section 127.

This is in contrast to the prior art, wherein a user is not allowed to modify mode variables. This may be due to use of a non-erasable non-volatile memory in the prior art, or may even be due to a software control routine of a prior art camera that does not allow user changes. This is commonly done for cost reasons and as a safeguard. In the prior art, camera designers have limited the user's ability to make changes, and have not allowed a user to determine which mode variables are sticky or non-sticky.

Therefore, the image capturing device 100 employs an erasable, programmable non-volatile memory section 127 that enables a user to change mode variables. Moreover, the control routine executing in the processor 111 is designed so as to allow a user to make a change, specify the change as permanent, and then write the changed mode variable into the user-programmable non-volatile memory section 127.

Figure 2:
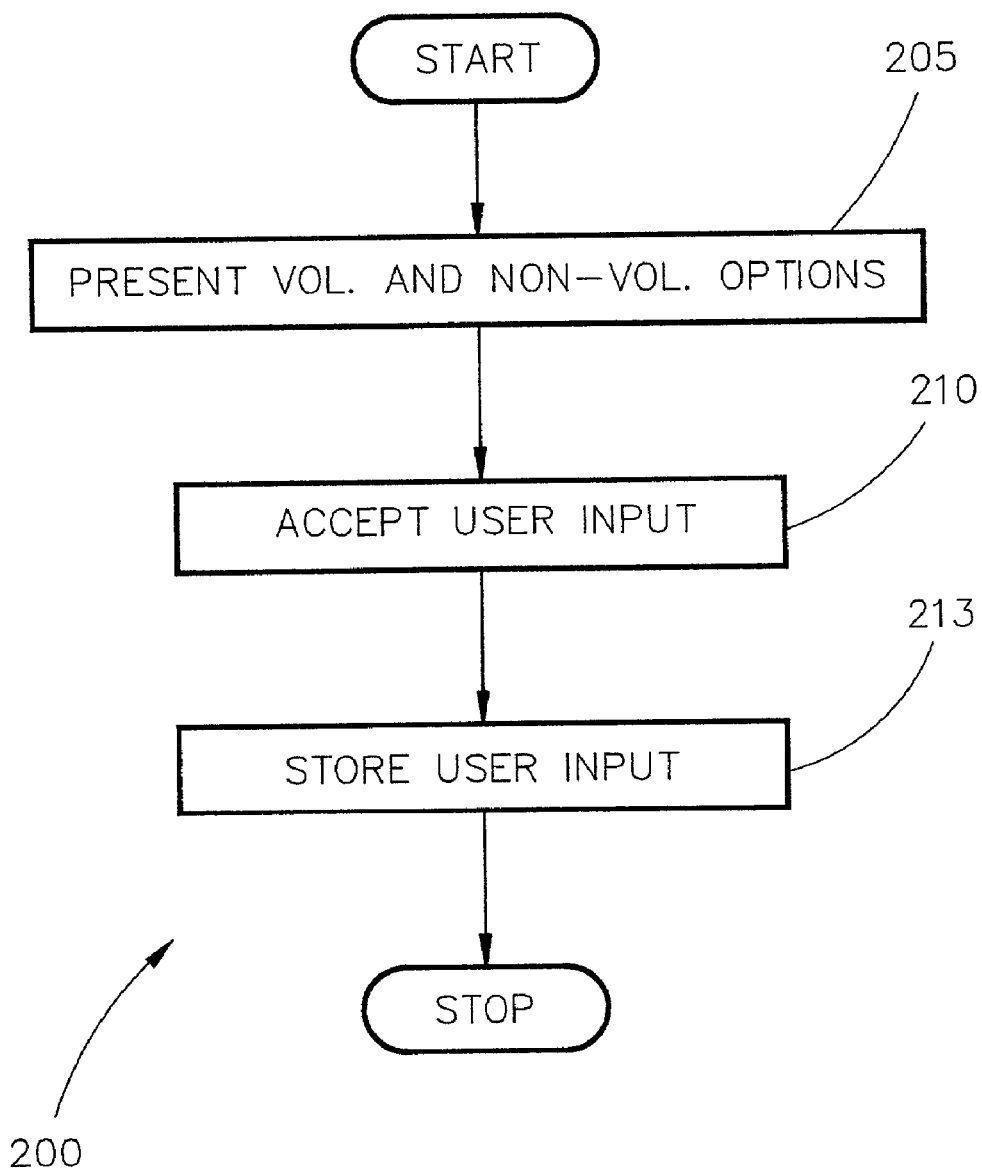
FIG. 2 is a flowchart of an image capturing device initialization set-up method.

FIG. 2 is a flowchart 200 of an image capturing device initialization set-up method according to one embodiment of the invention. In step 205, the volatile and non-volatile options are presented to the user, such as for example, through a menu. In addition, the current volatile or non-volatile status of a mode variable may be displayed. The user may choose a volatile or user-programmable non-volatile memory cell for each mode variable or for each block of mode variables.

In step 210, a user input is accepted. The user may select a volatile or user-programmable non-volatile memory section for each mode, and therefore for each mode variable. The user inputs may designate whether the user wants to use a volatile or non-volatile value for a particular mode, such as for example, a strobe mode. The user may choose to use a volatile value that is reset at every power-on cycle. For example, the user may want to change the strobe mode for a particular image capture, but is happy with the factory-programmed auto strobe value the rest of the time. Alternatively, the user may want to use a non-volatile value when the user has a preferred mode of operation.

In addition, the user mode inputs may optionally be performed on a block basis, such as a block of similar power-on variables. For example, all variables pertaining to particular settings, such as language settings, etc., may be segregated in a particular block, and the user may have to perform fewer operations in order to make such power-on variables volatile or non-volatile.

In step 213, the user input is stored, such as in the select memory section 129. The select memory section 129 is also a user-programmable non-volatile memory section so that the user selection of volatile or non-volatile mode variables is likewise retained over a power cycle.

The above method applies to an image capturing device 100 wherein a select memory section 129 is employed, and is not necessary if the image capturing device 100 allows the user to directly write values to the user-programmable nonvolatile memory section 127.

In an image capturing device 100 wherein the user is allowed to directly write memory values to the user-programmable non-volatile memory section 127, the only steps necessary for a write may be to set a write enable variable (i.e., disabling a write-protect function).

Figure 3:
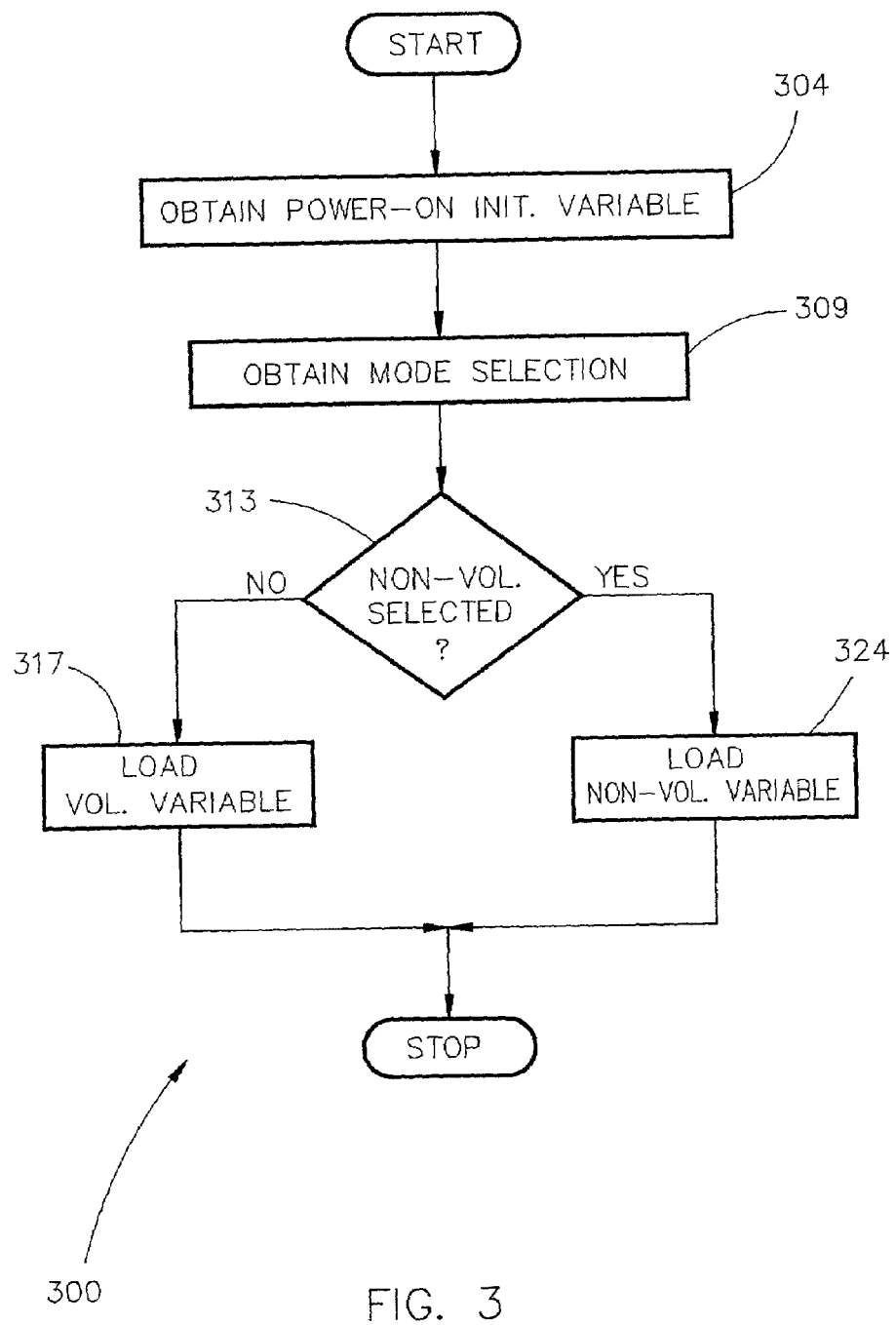
FIG. 3 is a flowchart of a power-on initialization method.

FIG. 3 is a flowchart 300 of a power-on initialization method according to another embodiment of the method. In step 304, the image capturing device obtains a power-on initialization mode variable. For example, the initialization routine may process all mode variables upon power-up of the image capturing device 100.

In step 309, the image capturing device 100 obtains a select variable. The select variable is obtained from the select memory section 129 and may be a flag or other variable that indicates whether to use a mode variable value from the volatile memory section 131 or from the user-programmable non-volatile memory section 127.

In step 313, it is determined whether the select memory section 129 indicates a non-volatile or volatile mode variable. If non-volatile is indicated, the method proceeds to step 324; otherwise, it proceeds to step 317.

In step 317, the image capturing device 100 loads a volatile power-on initialization variable from the volatile memory section 131.

In step 324, the image capturing device 100 loads a non-volatile power-on initialization variable from the user-programmable non-volatile memory section 127. This may include copying the value from a cell of the user-programmable non-volatile memory section 127 into the corresponding cell of the volatile memory section 131.

It should be understood that although a specific order for loading a mode variable is shown, the loading may be performed in other manners. For example, the power-on initialization may alternatively operate by first loading a volatile mode variable, and then overwriting that load operation with a non-volatile mode variable if the select variable specifies a non-volatile mode variable. This modifies FIG. 3 by putting step 317 ahead of step 313. As a result, if in step 313 it is determined that a volatile mode variable is specified, the method exits.

In an image capturing device embodiment that does not include the select memory section 129, steps 309, 313, and 317 are not included. In this embodiment, upon power-on initialization the mode variables are read directly out of the user-programmable non-volatile memory section 127.

The initialization may be iteratively performed for a plurality of mode variables. After either a volatile or non-volatile variable has been loaded for all mode variables, the image capturing device 100 may then use that mode variable during operation. If the volatile power-on variable is used, it will be lost in the next power cycle. If the non-volatile power-on variable is used, it will be retained over all subsequent power cycles.

When the values in the user-programmable non-volatile memory section 127 are being programmed by the user, the user may need to go through a menu or other input structure that preferably requests that the user confirm a desire to change. This may include changing an associated read/write variable in the read/write cells 135. After the write operation is complete, the read/write variable will preferably revert to a read-only state. This constrains changes to the user-programmable non-volatile memory section 127 to occur within certain parameters and guards the contents of the user-programmable non-volatile memory section 127 against inadvertent changes.

I claim:

1. An image capturing device, comprising:
   a user interface capable of receiving a mode change input from a user;
   a processor communicating with said user interface; and
   a memory communicating with said processor and including a user-programmable non-volatile memory section, with said user-programmable non-volatile memory section storing one or more non-volatile mode variables;
   wherein said processor is capable of overwriting a non-volatile mode variable value in said user-programmable non-volatile memory section in response to said mode change input from said user, and
   wherein said memory further stores a plurality of select variables corresponding to said plurality of non-volatile mode variables and wherein said plurality of select variables determine use of a mode variable from either a volatile memory section of said memory or from said user-programmable non-volatile memory section.

2. The image capturing device of claim 1, wherein said user interface is capable of displaying a volatile or non-volatile status of a mode variable.

3. The image capturing device of claim 1, wherein said memory further includes a plurality of read/write cells corresponding to a plurality of non-volatile memory cells in said user-programmable memory section, with a read/write cell capable of controlling a write state of a corresponding user-programmable non-volatile memory cell.

4. The image capturing device of claim 1, wherein said memory further includes one or more block select variables that designate one or more blocks of mode variables.

5. A power-on initialization set-up method for an image capturing device, comprising the steps of:
   presenting a volatile mode variable option and a non-volatile mode variable option to a user;
   storing a mode variable to a user-programmable non-volatile memory section if said user specifies said non-volatile mode variable option;
   accepting a user input designating either said volatile mode variable option or said non-volatile mode variable option for a particular mode variable; and
   storing a select variable in a select memory section; wherein said select variable selects a mode variable value to be loaded from either said volatile memory section or from said user-programmable non-volatile memory section.

6. The method of claim 5, wherein the presenting step is done on a display.

7. The method of claim 5, wherein the presenting step is done in a menu on a display.

8. The method of claim 5, further comprising the step of accepting a user input that designates a volatile memory section or a user-programmable non-volatile memory section for an individual mode variable.

9. The method of claim 5, further comprising the step of accepting a user input that designates a volatile memory section or a user-programmable non-volatile memory section for a block of mode variables.

10. The method of claim 5, further comprising the step of displaying a volatile or non-volatile status of a mode variable.

11. The method of claim 5, wherein the method is iteratively performed for a plurality of mode variables.

12. A power-on initialization method, comprising the steps of:
   obtaining a power-on initialization mode variable;
   loading a volatile power-on initialization mode variable from a user-programmable non-volatile memory section;
   obtaining a select variable corresponding to said power-on initialization mode variable; and
   loading a volatile power-on initialization mode variable from a volatile memory section if said select variable specifies a volatile mode variable and loading a non-volatile power-on initialization mode variable from a user-programmable non-volatile memory section if said select variable specifies a non-volatile mode variable.

13. The method of claim 12, wherein the method loads an individual mode variable.

14. The method of claim 12, wherein the method loads a block of mode variables.

15. The method of claim 12, wherein the method is iteratively performed for a plurality of mode variables.

16. An image capturing device, comprising:
   a user interface capable of receiving a mode change input from a user;
   a processor communicating with said user interface; and
   a memory communicating with said processor and including a user-programmable non-volatile memory section, with said user-programmable non-volatile memory section storing one or more non-volatile mode variables, wherein
   said processor is capable of overwriting a non-volatile mode variable value in said user-programmable non-volatile memory section in response to said mode change input from said user, and
   said memory further stores a plurality of select variables corresponding to said plurality of non-volatile mode variables and wherein said plurality of select variables determine use of a mode variable from either a volatile memory section of said memory or from said user-programmable non-volatile memory section, and further wherein a mode variable value in said volatile memory section is overwritten with a mode variable value from said user-programmable non-volatile memory section upon a power-on initialization.

17. The image capturing device of claim 16, wherein said user interface is capable of displaying a volatile or non-volatile status of a mode variable.

18. The image capturing device of claim 16, wherein said memory further includes a plurality of read/write cells corresponding to a plurality of non-volatile memory cells in said user-programmable memory section, with a read/write cell capable of controlling a write state of a corresponding user-programmable non-volatile memory cell.

19. The image capturing device of claim 16, wherein said memory further includes one or more block select variables that designate one or more blocks of mode variables.

* * * * *